United States Patent
Osing et al.

(10) Patent No.: US 6,363,827 B1
(45) Date of Patent: Apr. 2, 2002

(54) METHOD FOR PRODUCING SAW BANDS

(75) Inventors: Heinz-Jürgen Osing, Iserlohn; Werner Lenoir, Unna; Christoph Jänsch, Kamen; Laszlo Rozsnoki, Aachen, all of (DE); Oskar Pacher, Graz (AT)

(73) Assignee: Stahlwerk Ergste Westig GmbH, Schwerte (DE)

(*) Notice: Subject to any disclaimer, the term of this patent is extended or adjusted under 35 U.S.C. 154(b) by 0 days.

(21) Appl. No.: 09/555,679

(22) PCT Filed: Dec. 7, 1998

(86) PCT No.: PCT/EP98/07938

§ 371 Date: Jul. 26, 2000

§ 102(e) Date: Jul. 26, 2000

(87) PCT Pub. No.: WO99/29464

PCT Pub. Date: Jun. 17, 1999

(30) Foreign Application Priority Data

Dec. 5, 1997 (DE) .......................... 197 53 952

(51) Int. Cl.[7] .............................. B23D 57/00
(52) U.S. Cl. ............................ 83/835; 76/112
(58) Field of Search ................ 76/112, 104.1; 30/349, 357; 83/835

(56) References Cited

U.S. PATENT DOCUMENTS

| | | | | | |
|---|---|---|---|---|---|
| 1,535,096 A | * | 4/1925 | Blum | ...... | 30/112 X |
| 2,683,923 A | * | 7/1954 | Replogle | ...... | 30/112 X |
| 3,034,378 A | * | 5/1962 | Anderson | ...... | 30/112 |
| 3,034,379 A | | 5/1962 | Bernstein et al. | | |
| 3,766,808 A | | 10/1973 | Cremisio et al. | | |
| 4,144,777 A | | 3/1979 | Nystrom et al. | | |
| 4,911,037 A | * | 3/1990 | Werz | ...... | 30/112 |

FOREIGN PATENT DOCUMENTS

| | | |
|---|---|---|
| AT | 398 176 B | 10/1994 |
| DE | 195 01 442 A1 | 7/1996 |

OTHER PUBLICATIONS

Aug. 4, 1999, International Search Report.

* cited by examiner

*Primary Examiner*—Douglas D. Watts
(74) *Attorney, Agent, or Firm*—Merchant & Gould P.C.

(57) ABSTRACT

In a method of producing saw bands and saw blades with improved dimensional and setting stability, a supporting band (2) with 0.2 to 0.6% carbon, 0.5 to 6.0% chromium and up to 3.5% tungsten, molybdenum and vanadium—individually or in addition to one another—the remainder being iron, is welded to a cutting band (3) of a high-speed steel and the weld (4) is thereby adjusted to a ratio of its average width to the thickness of the band or blade of 0.30 to 0.9.

10 Claims, 2 Drawing Sheets

METHOD FOR PRODUCING SAW BANDS

Figure 1:
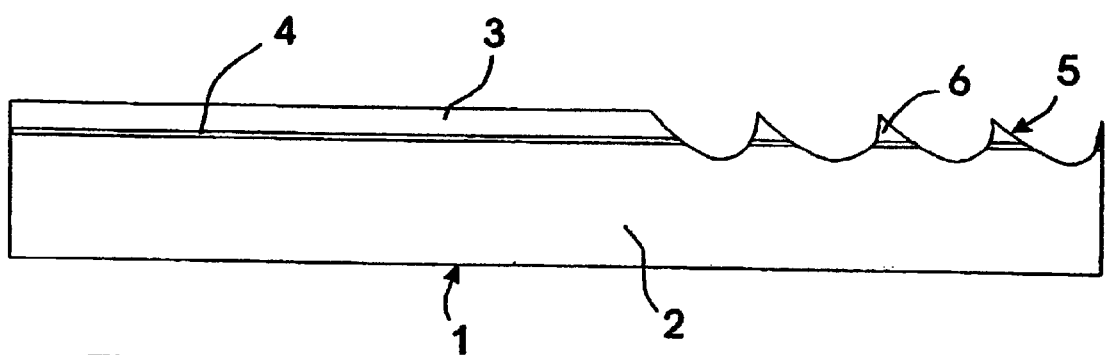

The invention relates to a method of producing saw bands and saw blades, in particular bandsaw blades for planing, contouring, mitering and parting cuts.

Saw bands and saw blades must have high dimensional stability of their cutting edges as well as high wear resistance and be able to withstand the high loading produced by compressive, flexural and shearing forces even under the not inconsiderable temperatures which result from the friction between the saw blade and the material being sawn. This applies especially to bandsaw blades, which circulate at high speed and are subjected to great curvature where they are deflected.

Since it is difficult to combine the properties mentioned above in a single material, saw blade blanks nowadays usually comprise a relatively tough supporting band with high bending fatigue strength and a cutting-edge band of a high-speed or cold work steel that is less tough but highly wear resistant. The cutting-edge band is in this case of such a width that at least the teeth tips of the saw band or blade, or else the cutting teeth as a whole, can be cut out from it.

It is known to join the supporting band and the cutting-edge band to each other by laser or electron-beam welding without filler material. From the bi-metal blank produced in this way, the teeth are cut out on the cutting edge side after annealing to eliminate welding stresses. This involves bending the teeth away alternately to one side and to the other side, to a greater or lesser extent out of the plane of the band, by setting. The setting is followed by subsequent austenitizing with water quenching and tempering, repeatedly if need be, for adjusting the wear resistance of the teeth or teeth tips.

It has been found in practice that distortion of the teeth or teeth tips often occurs during heat treatment, so that they no longer assume the intended angular position with respect to the plane of the saw band or saw blade and are consequently subjected to considerably greater wear. The local differences in concentration in the region of the weld have been found to be a cause of this. Such differences in concentration and, in particular, the concentration gradient transversely to the weld inevitably created when welding two materials of different compositions often lead to residual stresses and consequently to impairment of the service life. Added to this is the fact that, in the subsequent heat treatment, with its sometimes abrupt temperature changes, in particular during quenching, excessive local internal stresses often occur in the region of the weld or in the transition from one material to the other, lead to cracking and likewise impair the service life as a result of the crack propagation caused by the high flexural forces.

To improve weldability, Austrian Patent 398 176 proposes the use of a cutting-tool steel alloy with 0.7 to 2.3% carbon, 0.08 to 2.0% aluminum and 0.7 to 6.5% vanadium as well as a supporting steel with 0.15 to 0.50% carbon, 0.015 to 0.18% aluminum and 0.10 to 0.6% vanadium. With the relatively high contents of carbon and aluminum and the simultaneous presence of vanadium in the cutting-tool steel alloy, it is intended to influence the transformation behavior in such a way that higher tempering temperatures, and accordingly a higher secondary hardness and wear resistance, are possible. The relatively high aluminum content is intended in this case to ensure a higher carbon content without the risk of graphite precipitation, and accordingly a higher carbide fraction with correspondingly higher wear resistance.

Furthermore, U.S. Pat. No. 3,034,379 discloses the proposal of arranging between the cutting-edge steel band and the supporting band a thin strip of a heat-resistant steel of high hardness and low thermal conductivity, for example of an austenitic steel with a least 12% chromium. This procedure is very complex, however, because it requires not only precise insertion of the intermediate strip but also two welds. What is more, the welding of three materials of different compositions leads to even greater differences in concentration, with the disadvantageous consequences discussed above in conjunction with producing bi-metal blanks.

The invention is therefore based on the problem of finding a way of eliminating the disadvantageous inhomogeneities in the region of the weld and in this a way extending the service life of the saw bands and blades.

This problem is solved by a method in which a supporting band of relatively tough steel, in particular of high bending fatigue strength, and a cutting-edge steel band or blade of a high-speed steel are welded to each other and the weld is thereby adjusted to a ratio of its average width to the thickness of the band $$B_m/D = 0.30 \text{ to } 0.9.$$

Saw bands and blades produced by the method according to the invention are distinguished by high dimensional and setting stability, i.e. the saw teeth remain in their intended position in spite of high loading and high working temperatures; their wear is therefore comparatively low.

The supporting band steel preferably contains 0.2 to 0.6% carbon, 0.5 to 6%, preferably at most 1.5%, chromium as well as up to 3.5% tungsten, molybdenum and vanadium, individually or in addition to one another, preferably 1.5 to 2.5% molybdenum and 0.10 to 0.75% vanadium, even if carbon contents of at least 0.4% or else 0.45 to 0.55%, preferably 0.35%, have proven to be particularly successful. The total content of alloying agents is preferably 3.12 to 8.48%.

Particularly suited is a supporting band steel with 0.32% carbon, 0.35% silicon, 0.70% manganese, 1.00% chromium, 2.00% molybdenum, 0.6% nickel, 0.15% vanadium and 0.05% tungsten, the remainder being iron.

The invention is based on the realization that the geometry of the weld is of decisive significance with regard to the service life of the saw bands and blades.

So far, relatively narrow welds of the order of magnitude of 0.25 mm have been used in practice, with a view to as small a proportion of cutting-tool steel as possible, and the thickness of the band has not been given the necessary attention. This is so because small weld widths are inevitably accompanied by a correspondingly low heat input during welding and a similarly small amount of liquid phase of the two adjacent materials. Since the intermixing of the two materials of different kinds takes place essentially by means of diffusion and the diffusion is both time-dependent and temperature-dependent, in the customary welding methods there is generally not adequate intermixing in the liquid phase and accordingly also not a smooth or continuous change in concentration in the region of the transition from one material to the other. This disadvantage is all the more serious the thicker the two bands to be welded to each other; this is so since the relatively large mass of the cold materials neighboring the weld on both sides, said mass increasing with the thickness of the band, exerts a strong quenching effect on the welds and leads to very steep temperature and viscosity gradients. This has the consequence of the inhomogeneities mentioned above in the region of the weld and the accompanying defects that greatly impair the service life.

By contrast, the invention teaches a geometry of the weld which takes the thickness of the band into account and ensures that an amount of liquid melt that ensures adequate concentration equalization is produced during welding. This applies especially to the carbide-forming elements, and the resultant carbides, ensuring high wear resistance.

Laser welding is especially suitable for the method according to the invention, because it works with inert gas, generally argon or helium, and therefore not only prevents oxidation of the melt but also promotes degassing of the latter, which is of particular advantage in the case of highly alloyed high-speed steels and powder-metallurgically produced steels in particular. Also suited, however, are other welding methods, in particular electron-beam welding, if the electron beam is in this case defocused in such a way that the width required for the geometry of the weld according to the invention is obtained.

The following high-speed steels come into consideration as the cutting-tool steel:

| DIN | AISI/SAE |
|---|---|
| — | Matrix 2 |
| S 6-5-2 | M 2 |
| S 6-5-3 | M3 Type 2 |
| S 2-10-1-8 | M 42 |
| S 10-4-3-10 | M 51 |

The cutting-tool steel contains up to a total of 20% tungsten, molybdenum, vanadium and niobium; however, it may also have greater contents of these alloying constituents within the scope of the invention. The minimum content should, however, lie above 7%.

The cutting-tool steel preferably contains a total of at least 8% or else at least 12% tungsten, molybdenum, vanadium and niobium.

The method according to the invention is also suitable in particular for use of particularly wear-resistant powder-metallurgically produced high-speed steels.

The saw band or blade blank is preferably subjected to stress-relief annealing before the shaping operation. After setting, the saw band or blade is normally austenitized, quenched and then tempered—repeatedly if need be.

Figure 2:
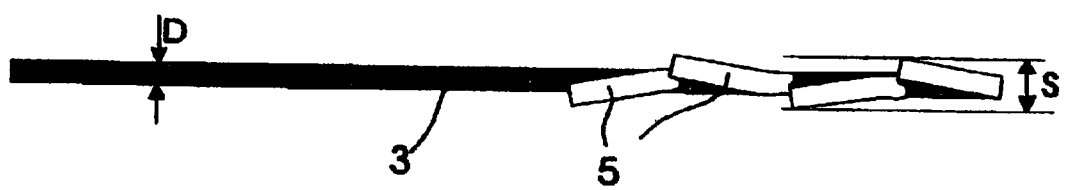
Figure 3:
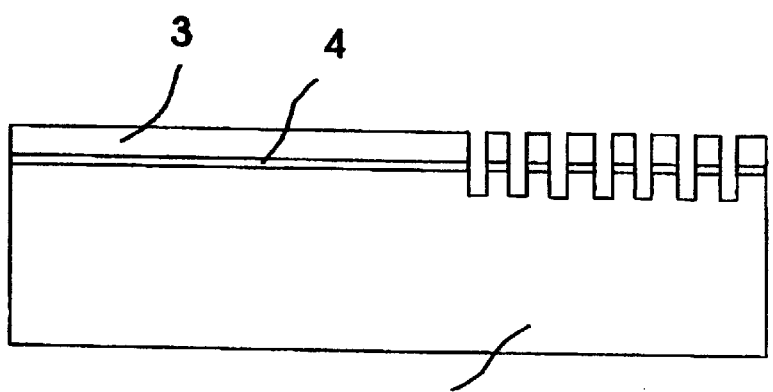
Figure 4:
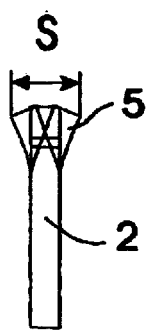
Figure 5:
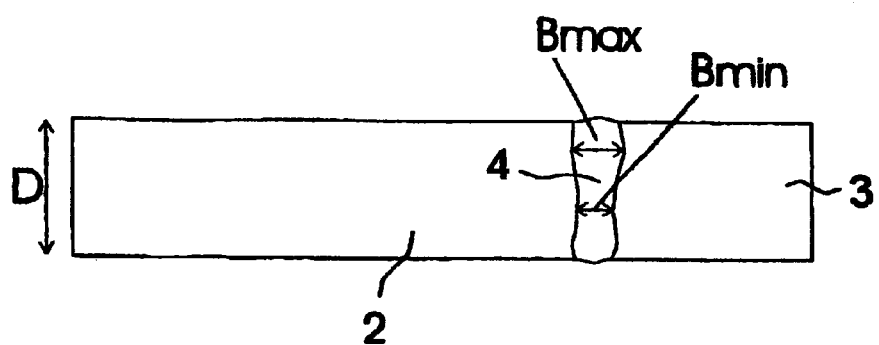

The invention is explained in more detail below on the basis of exemplary embodiments and the drawing, in which:

FIG. 1 shows the side view of a bi-metal saw blade, partly as a blank and partly in the finished state, FIG. 2 shows a plan view of the tooth side of the saw blade of FIG. 1, FIG. 3 shows a partly already punched saw blade blank, FIG. 4 shows a side view of the saw blade of FIG. 1 and FIG. 5 shows a schematic cross-sectional representation in the region of the weld.

The weld blank 1 comprises a highly tough supporting band 2, in particular of high bending fatigue strength, and a cutting-tool steel band 3, which are joined to each other by means of a weld 4. From the blank band produced in this way, the saw teeth 5 are then cut out in such a way that at least their tips 6 consist of cutting tool steel. The saw teeth 5 are then set in a bending apparatus. Taking the band thickness D into account, the setting is in this case $$S = 2 \times D \text{ to } 3 \times D.$$

The schematic representation in FIG. 5 shows how the average weld width variation is determined, to be precise according to the formula $$B_m = (B_{max} - B_{min})/2.$$

In the course of a series of tests, bi-metal blanks were initially produced by laser welding using the supporting band steels evident from the following Table I and the cutting tool steels evident from Table II.

TABLE I

| Supporting band | C (%) | Si (%) | Mn (%) | Cr (%) | Mo (%) | Ni (%) | V (%) | W (%) |
|---|---|---|---|---|---|---|---|---|
| A 1 | 0.32 | 0.35 | 0.95 | 3.85 | 1.45 | 0.62 | 0.30 | 0.05 |
| A 2 | 0.58 | 0.50 | 0.70 | 4.10 | 0.50 | 0.20 | 0.02 | 0.02 |
| A 3 | 0.32 | 0.35 | 0.68 | 1.05 | 2.05 | 0.55 | 0.14 | 0.06 |
| A 4 | 0.30 | 0.22 | 0.40 | 3.90 | 2.50 | 0.45 | 0.20 | 0.05 |

TABLE II

| Cutting tool steel | C (%) | Cr (%) | Mo (%) | (V + Nb) (%) | W (%) | Co (%) | Fe* (%) | Production |
|---|---|---|---|---|---|---|---|---|
| B 1 | 0.90 | 4.4 | 5.0 | 1.9 | 6.4 | 0 | Remainder | conv. |
| B 2 | 1.26 | 4.3 | 3.9 | 3.2 | 9.8 | 10.5 | Remainder | conv. |
| B 3 | 1.55 | 4.0 | 6.2 | 4.0 | 8.0 | 8.2 | Remainder | PM** |
| B 4 | 0.80 | 4.2 | 3.1 | 2.0 | 3.0 | 8.0 | Remainder | PM** |

*Including impurities caused by melting

EXAMPLE 1

For producing the bi-metal blanks, the materials to be welded to each other were joined together with an exact fit by means of ceramic guides, fixed and welded under normal pressure by means of argon as the inert gas at a rate of 8 l/min on the upper side and 4 l/min on the underside, using a ROFIN $CO_2$ laser with an output of 2.6 kW and a welding rate of 11 m/min.

After cooling to room temperature, the blank was completely planar and exhibited just slight annealing colors in the edge region.

EXAMPLE 2

In further tests, a high-power Nd:YAG laser with a focal length of 100 mm was used, operated in the cw mode with an output of 3.0 kW. At the same time, the focal position was adjusted such that the geometry of the weld according to the invention was ensured. During welding, argon or helium at a rate of 9 l/min on each side of the band served as the inert gas. In this test, it was possible to raise the welding rate to 14 m/min; the apparatus used for the welding did not allow a further increase in the welding rate.

EXAMPLE 3

For comparison, bi-metal blanks were produced from three material combinations under the conditions of Examples 1 and 2, but by electron-beam welding. The edges of the bands to be welded to each other were carefully cleaned with an organic solvent. Subsequently, the two bands were welded to each other in a vacuum of $10^{-3}$ mbar at a welding rate of 10 m/min and an accelerating voltage of 150 kV.

After welding, the blanks were initially subjected to stress-relief annealing and then punched in a way corresponding to the representation in FIG. 3 and subsequently set in the way evident from FIGS. 2 and 4.

After setting, the specimens were austenitized and tempered twice at 560° C. In order to determine the dimensional stability of the specimens, the setting was determined once again after the tempering and cooling and the value $\Delta$ S/S was established as an indication of dimensional stability. In this respect, small values are ah indication of high dimensional stability or little distortion.

The data from the tests are compiled in Table III; their specimens 1 to 4 and 8 to 11 come under the invention, as evidenced by the relative weld width Bm respectively specified, while the other specimens are comparative specimens. The data of Table III show that the specimens according to the invention are distinguished by high dimensional stability and freedom from pores.

What is claimed is:

1. A method of producing a saw blade, comprising the steps of:
    welding a supporting band of tough steel and a cutting-tool steel band of a high-speed steel to each other, and adjusting a weld thereof such that a ratio of an average width variation of the weld Bm to a thickness of the blade D is $B_m/D$=0.30 to 0.9.

2. The method as claimed in claim 1, wherein the tough steel of the supporting band comprises 0.2 to 0.6% carbon, 0.5 to 6.0% chromium and up to 3.5% tungsten, molybdenum, vanadium, and niobium combined.

3. The method as claimed in claim 2, wherein the tough steel of the supporting band comprises 0.32% carbon, 0.35% silicon, 0.70% manganese, 1.00% chromium, 2.00% molybdenum, 0.6% nickel, 0.15% vanadium and 0.05% tungsten, a remainder of the tough steel being iron.

4. The method as claimed in claim 2, wherein the tough steel of the supporting band comprises at least 0.4% carbon.

5. The method as claimed in claim 2, wherein the tough steel of the supporting band comprises a carbon content of 0.45 to 0.55%.

6. The method as claimed in claim 1, wherein the high-speed steel over 7% tungsten, molybdenum, vanadium, and niobium combined.

7. The method as claimed in claim 6, wherein the high-speed steel comprises powder-metallurgy produced high-speed steel.

8. A saw blade comprising a supporting part and a cutting part joined to the supporting part with a weld, wherein a ratio of an average width variation of the weld Bm to a thickness of the blade D is $B_m/D$=0.30 to 0.9.

9. The saw blade as claimed in claim 8, wherein the supporting part comprises steel with 0.2 to 0.6% carbon, 0.5 to 6.0% chromium and up to 3.5% tungsten, molybdenum, vanadium, and niobium combined.

10. The saw blade is claimed in claim 9, wherein the supporting part comprises steel with 0.45 to 0.55% carbon.

* * * * *